US 6,486,267 B1
United States Patent
Bilodeau

(10) Patent No.: US 6,486,267 B1
(45) Date of Patent: Nov. 26, 2002

(54) RELEASE COMPOSITION

(75) Inventor: Wayne L. Bilodeau, Mentor, OH (US)

(73) Assignee: Avery Dennison Corporation, Pasadena, CA (US)

( * ) Notice: Subject to any disclaimer, the term of this patent is extended or adjusted under 35 U.S.C. 154(b) by 2 days.

(21) Appl. No.: 09/631,477

(22) Filed: Aug. 3, 2000

(51) Int. Cl.[7] ............................................... C08G 77/04
(52) U.S. Cl. .......................... 525/474; 528/12; 528/26; 528/29; 528/27; 525/103; 525/106; 525/479; 549/512
(58) Field of Search .................. 525/474, 103, 525/106, 479; 528/12, 27, 26, 29; 549/512

(56) References Cited

U.S. PATENT DOCUMENTS

| | | | |
|---|---|---|---|
| 3,503,782 A | 3/1970 | Ayres | 117/45 |
| 3,933,702 A | 1/1976 | Caimi et al. | 260/17 |
| 4,041,200 A | 8/1977 | Boranian et al. | 428/40 |
| 4,201,808 A | 5/1980 | Cully et al. | 428/40 |
| 4,279,717 A | 7/1981 | Eckberg et al. | 204/159.13 |
| 4,313,988 A | 2/1982 | Koshar et al. | 428/40 |
| 4,348,454 A | 9/1982 | Eckberg | 428/334 |
| 4,421,904 A | 12/1983 | Eckberg et al. | 528/27 |
| 4,513,059 A | 4/1985 | Dabroski | 428/355 |
| 4,547,431 A | 10/1985 | Eckberg | 428/413 |
| 4,640,967 A | * 2/1987 | Eckberg | 522/99 |
| 4,822,687 A | 4/1989 | Kessel et al. | 428/447 |
| 4,867,828 A | 9/1989 | McIntyre | 156/247 |
| 4,952,657 A | 8/1990 | Riding et al. | 528/27 |
| 5,061,524 A | 10/1991 | Hinterwaldner | 427/385.5 |
| 5,072,854 A | 12/1991 | Niemi et al. | 222/1 |
| 5,104,477 A | 4/1992 | Williams et al. | 156/401 |
| 5,202,190 A | 4/1993 | Kantner et al. | 428/447 |
| 5,210,121 A | 5/1993 | Hinterwaldner | 524/109 |
| 5,217,805 A | * 6/1993 | Kessel et al. | 428/352 |
| 5,260,348 A | 11/1993 | Shepherd et al. | 522/25 |
| 5,279,860 A | 1/1994 | Griswold et al. | 427/386 |
| 5,284,690 A | 2/1994 | Williams et al. | 428/40 |
| 5,318,815 A | 6/1994 | Newing et al. | 428/40 |
| 5,332,797 A | 7/1994 | Kessel et al. | 528/27 |
| 5,360,833 A | 11/1994 | Eckberg et al. | 522/31 |
| 5,364,888 A | 11/1994 | Aoki et al. | 522/31 |
| 5,409,773 A | 4/1995 | Kessel et al. | 428/352 |
| 5,562,992 A | 10/1996 | Kidon et al. | 428/447 |
| 5,596,669 A | 1/1997 | Murphy et al. | 385/128 |
| 5,612,107 A | 3/1997 | Sangani et al. | 428/41.7 |
| 5,625,022 A | 4/1997 | Onishi | 528/15 |
| 5,635,577 A | 6/1997 | O'Brien | 528/15 |
| 5,654,093 A | 8/1997 | Kidon et al. | 428/352 |
| 5,795,947 A | 8/1998 | Frances et al. | 528/15 |

(List continued on next page.)

FOREIGN PATENT DOCUMENTS

EP    0 464 706 A1    8/1992
WO    95/23694    8/1995

OTHER PUBLICATIONS

Technical Information. Vikopol® Epoxidized Polybutene; Elf Atochem North America, Inc.

Primary Examiner—Robert Dawson
Assistant Examiner—Jeffrey B. Robertson
(74) Attorney, Agent, or Firm—Renner, Otto, Boisselle & Sklar, LLP

(57) ABSTRACT

This invention relates to a curable release composition, comprising:

(A) a compound represented by the formula

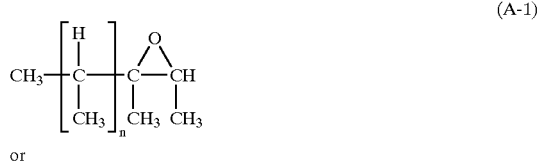

or

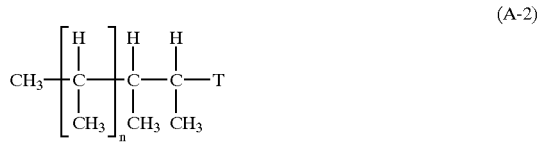

wherein: n is a number in the range of about 1 to about 60; and T is

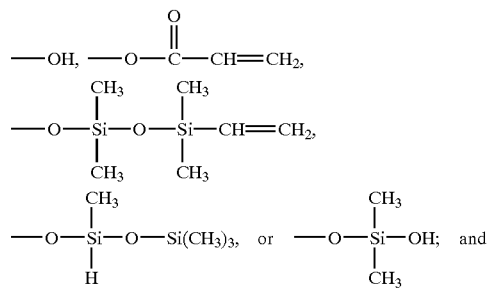

(B) a curable organopolysiloxane. This invention also relates to a method of making a release coated substrate comprising coating a substrate with the foregoing release composition and curing the coated composition. This invention relates to a release coated article comprising a substrate which has been coated with the foregoing release composition. The invention also relates to a multilayered article comprising a first substrate, a second substrate, a layer of the foregoing release composition which has been cured, and a layer of a pressure sensitive adhesive wherein the release layer is positioned between the first substrate and the layer of pressure-sensitive adhesive and is preferentially adherent to the first substrate, and the pressure-sensitive adhesive layer is positioned between the release layer and the second substrate and is preferentially adherent to the second substrate.

10 Claims, No Drawings

U.S. PATENT DOCUMENTS

| | | | | |
|---|---|---|---|---|
| 5,811,483 A | * | 9/1998 | Close | 524/500 |
| 5,866,261 A | | 2/1999 | Kerr, III et al. | 428/447 |
| 5,889,084 A | * | 3/1999 | Roth | 523/161 |
| 5,936,934 A | * | 8/1999 | Kuribayashi et al. | 369/286 |
| 6,040,040 A | * | 3/2000 | Rainbow | 427/146 |
| 6,057,033 A | | 5/2000 | Bilodeau | 428/372 |
| 6,087,067 A | * | 7/2000 | Kato et al. | 369/275.2 |

* cited by examiner

RELEASE COMPOSITION

TECHNICAL FIELD

This invention relates to release compositions and, more particularly, to release compositions that exhibit relatively high release force values in combination with relatively low levels of release noise.

BACKGROUND OF THE INVENTION

Release compositions are used, for example, to coat papers or films which are used as release backing sheets (sometimes referred to as protective release sheets or release liners) overlying the pressure-sensitive adhesive used in pressure-sensitive products such as labels, decals, tapes, etc. The pressure sensitive adhesive adheres to the release coated surface of the release backing sheet sufficiently to enable the pressure-sensitive products to be handled prior to use. When such products are used, the release backing sheet is pulled off and discarded. The exposed pressure-sensitive adhesive is pressed onto a surface where the pressure sensitive product is to be placed.

It is generally desirable that release-coated papers and films exhibit a release force which is low enough to enable the release backing sheet to be easily removed from a pressure sensitive adhesive coated substrate, but not so low that the release backing sheet will become separated from the pressure sensitive adhesive prior to when desired by forces normally encountered in handling and processing such as printing, die cutting and matrix stripping. "Release force" is defined as the amount of force required to peel or separate the release-coated substrate from the adhesive.

With some applications it is necessary to employ release coatings that exhibit relatively high release force values. These are typically used in applications such as labeling wherein high-speed equipment is required. A problem that often occurs with these high-release force materials is that they also exhibit high levels of release noise. "Release noise" is defined as the noise that is made when the release-coated substrate is peeled or separated from the adhesive.

The problem therefore relates to providing a release composition that exhibits a high release force value while at the same exhibits a low level of release noise. The present invention provides a solution to this problem by providing release compositions that exhibit relatively high release force values at relatively low levels of release noise.

SUMMARY OF THE INVENTION

This invention relates to a curable release composition, comprising: (A) a compound represented by the formulae

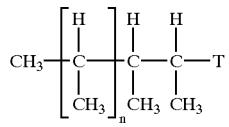

(A-1)

or

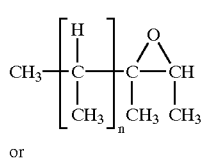

(A-2)

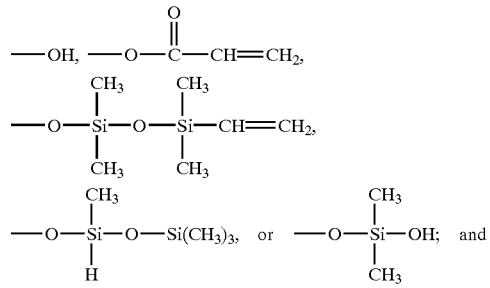

wherein: n is a number in the range of about 1 to about 60; and T is

—OH, —O—C(=O)—CH=CH$_2$,

—O—Si(CH$_3$)—O—Si(CH$_3$)—CH=CH$_2$,

—O—Si(CH$_3$)(H)—O—Si(CH$_3$)$_3$, or —O—Si(CH$_3$)$_2$—OH; and (B) a curable organopolysiloxane. This invention also relates to a method of making a release coated substrate comprising coating a substrate with the foregoing release composition and curing the coated composition. This invention relates to a release coated article comprising a substrate which has been coated with the foregoing release composition. The invention also relates to a multilayered article comprising a first substrate, a second substrate, a layer of the foregoing release composition which has been cured, and a layer of a pressure sensitive adhesive wherein the release layer is positioned between the first substrate and the layer of pressure-sensitive adhesive and is preferentially adherent to the first substrate, and the pressure-sensitive adhesive layer is positioned between the release layer and the second substrate and is preferentially adherent to the second substrate.

DESCRIPTION OF THE PREFERRED EMBODIMENTS

Component (A) of the inventive release composition is a compound represented by the formulae

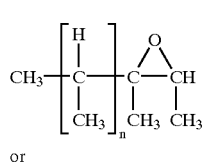

(A-1)

or

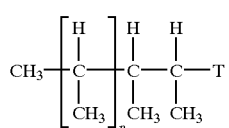

(A-2)

wherein: n is a number in the range of about 1 to about 60; and T is

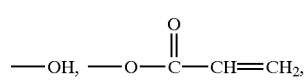

-continued

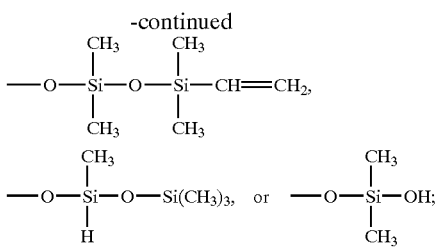

In one embodiment, n is a number in the range of about 4 to about 40, and in one embodiment about 6 to about 36, and in one embodiment about 6 to about 24, and in one embodiment about 6 to about 18, and in one embodiment about 8 to about 12.

An example of a commercially available material represented by formula (A-1) is available from Elf Atochem under the tradename Vikopol 24. This material has a structure corresponding to formula (A-1) wherein n is about 10. Vikopol 24 has an estimated molecular weight of 365 and a viscosity at 25° C. of about 125 centipoise. Another example is Vikopol 64 which is similar to Vikopol 24 except that n is about 32. Vikopol 64 has an estimated molecular weight of about 973 and a viscosity at 25° C. of about 300 poise.

The organopolysiloxane (B), which may be a polydimethylsiloxane, may be room temperature curable, thermally curable or radiation curable. Generally, the room temperature and thermally curable compositions comprise at least one organopolysiloxane and at least one catalyst or curing agent for such organopolysiloxane(s). Such compositions may also contain at least one cure accelerator and/or adhesivity promoter (sometimes referred to as an anchorage additive). As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

A wide variety of organopolysiloxanes (commonly called silicones) can be used in the practice of the invention. Such organopolysiloxanes are also sometimes referred to as polymeric silicone resins, rubbers, oils or fluids. These organopolysiloxanes are well known and fully described in the literature. These organopolysiloxanes are comprised essentially of silicon atoms connected to each other by oxygen atoms through silicon-oxygen linkages, e.g.,

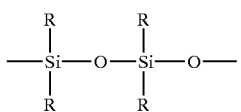
(B-1)

wherein in formula (B-1) each R is an organic group, generally an alkyl group 1 to about 2 carbon atoms, and in one embodiment 1 carbon atom. The organopolysiloxanes, in one embodiment, are high molecular weight polymers or copolymers having molecular weights in the range of about 5,000 to 250,000, and in one embodiment about 8,000 to about 100,000. In one embodiment, these organopolysiloxanes are soluble in at least one hydrocarbon solvent, examples of which include xylene, toluene, methyl ethyl ketone, carbon tetrachloride, and the like. In general, any organic solvent having a boiling point equal to or less than that of xylene may be used in the compositions used in the practice of the invention. The solvent merely serves as a convenient vehicle or carrier for uniform application of the inventive release composition to a substrate. Thus, higher boiling solvents may be used but their use is usually not commercially economical. Various organopolysiloxanes are commercially available in organic solvents in various percent solids concentration. Exemplary of the silicone (organopolysiloxane) materials which can be used in forming the inventive release compositions include those disclosed in U.S. Pat. Nos. 2,258,218; 2,258,220; 2,258,222; 2,494,920; 3,432,333; and 3,518,325, which are incorporated herein by reference for their disclosures of such silicone materials.

Suitable catalysts which can be employed in the curing of the release compositions of the invention include various compounds containing metals such as tin, lead, platinum, rhodium, etc. Generally, the catalysts are tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide, and others well known in the art as curing agents or catalysts for organopolysiloxane (silicone) materials. Useful catalysts include the carboxylic acid salts of organotin compounds containing at least one carbon-tin bond. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. The amine salts of carboxylic acids can also be used as curing agents in the inventive release compositions.

The cure accelerators and/or adhesivity promoters which can be used in the inventive release compositions are also well known in the art. Exemplary of such cure accelerators and/or adhesivity promoters are amines, amine-functional silanes and amine precursors previously discussed as well as other silane derivatives such as acetoxy-functional silanes and orthosilicates such as tetra(diethylene glycol monomethyl ether) silane. Orthosilicates include ethylene glycol derivatives having the formula $Si[(OC_2H_4)_2OR]_4$, wherein R is alkyl or alkenyl group having up to about 8 carbon atoms, e.g., methyl, ethyl, isopropyl, butyl, octyl, vinyl, allyl, etc., and $Si(OCH_2H_4OR^1)_4$ wherein $R^1$ is an alkyl or alkenyl group having up to about 8 carbon atoms, e.g., methyl, propyl, butyl, pentyl, hexyl, allyl, pentenyl, etc. Isocyanate compounds include any isocyanate which is soluble in organic solvents and which has an average of at least two isocyanate groups per molecule. Such isocyanates can be monomeric or polymeric in nature, e.g., the isocyanate can be a partially hydrolyzed toluene diisocyanate. In other words, a urea or polyurea which still retains isocyanate groups in the molecules or a polybiuret containing unreacted isocyanate groups are typical of the isocyanate compound which can be used in the practice of the invention. Other such isocyanates include the reaction products of an isocyanate with a polyhydroxyl compound (i.e., a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group.

At least some of these compounds also function as curing catalysts per se as well as cure accelerators and/or adhesivity promoters. The amount of curing agent or catalyst, cure accelerator and/or adhesivity promoter employed in the inventive release compositions can be varied widely depending upon the curing temperature, the particular catalyst used, the particular organopolysiloxane materials selected, the particular cure accelerator and/or adhesivity promoter used, the substrate, desired curing time, etc. Usually the amount of any of such components will be in the range of about 0.5 to about 20 weight percent of the organopolysiloxane.

Radiation-curable organopolysiloxanes are useful. These can be cured by ultraviolet or electron beam radiation with or without the assistance of a photoinitiator. In one embodiment, the organopolysiloxane contains acryloxy groups, methacryloxy groups, or mixtures thereof. A variety of acryloxy or methacryloxy containing organopolysiloxanes are known and can be used for the inventive release compositions. In one embodiment, the organopolysiloxane compounds containing acryloxy and/or methacryloxy groups which can be utilized in the present invention may be presented by the formula $$[R_n SiO_{4-n/2}]_m \tag{B-2}$$

wherein in formula (B-2), each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc. n has an average value of about 1.8 to 2.2. m has an average value greater than 2, and in one embodiment greater than about 25, and in one embodiment, from about 100 to about 500. These organopolysiloxanes contain an average of at least one R group which contains an acryloxy or methacryloxy group, namely,

wherein X is hydrogen or methyl. The substituents represented by R in formula (B-2) include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. In one embodiment, there are present an average of from about 2 to about 25, and in one embodiment from about 2 to about 10 of the R groups containing an acryloxy or methacryloxy group. Alternatively, the organopolysiloxane compounds containing acryloxy and/or methacryloxy groups may be defined as containing from about 3% to about 75% by weight of acryloxy or methacryloxy groups, and in one embodiment from about 3% to about 50% by weight of the acryloxy or methacryloxy groups. Such organopolysiloxanes may have an average molecular weight of from about 1000 to about 20,000. Organopolysiloxanes of higher molecular weight also may be used.

Typically, the R groups in formula (B-2) have the structure

wherein in formula (B-3), R' is a divalent hydrocarbon group of from 1 to about 15 carbon atoms or an oxyalkylene group containing from 1 to about 4 carbon atoms in the alkylene moiety.

The organopolysiloxanes containing the acryloxy or methacryloxy groups of formula (B-3) can be prepared, for example, by reacting a organopolysiloxane containing hydroxyl groups or epoxy groups with acrylic acid or methacrylic acid. The organopolysiloxanes containing hydroxyl groups may be prepared by reacting a reactive organopolysiloxane (e.g., containing halogen) with a polyhydroxy compound such as ethylene glycol, propylene glycol, glycerol or pentaerythritol.

The organopolysiloxanes described above may be linear or branched. As will be recognized by those skilled in the art, the organo-polysiloxanes of formula (B-2) will also have an appropriate number of end-capping units, $R_3SiO$— at the terminals of the molecule where R is as previously defined.

The organopolysiloxanes containing acryloxy and/or methacryloxy groups as described above are generally fluids which have viscosities typically in the range of from about 25 cps to 10,000 cps. Organopolysiloxanes of the type described above are known in the art, and various methods for producing such organopolysiloxanes are described in U.S. Pat. Nos. 3,878,263; 4,064,286; 4,301,268; 4,306,050; 4,908,274; 4,963,438; 4,978,726; and 5,034,491, which are hereby incorporated by reference for their disclosure of acrylate or methacrylate containing organopolysiloxanes and methods of preparing organopolysiloxanes containing acryloxy and/or methacryloxy groups useful in the compositions of the present invention.

Organopolysiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation Tergo® RC, and more particularly, under designations such as RC 450, RC 450N, RC 706, RC 707, RC 710, RC 720 and RC 726. Some of these organopolysiloxanes are of the type prepared by the reaction of acrylic acid or methacrylic acid with dimethylpolysiloxane containing hydroxyl groups or epoxy groups.

In one embodiment of the present invention, a portion of the acrylated or methacrylated organopolysiloxane may be replaced by a liquid monoacrylate ester. For example, from about 1% to about 20% by weight of the acrylated or methacrylated organopolysiloxane may be replaced by a liquid monoacrylate ester to modify the properties of the curable release composition of the invention and, in some instances, the properties of the cured release composition. The liquid monoacrylate esters generally are characterized by a low viscosity such as from about 1 to about 50 centipoise at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

In one embodiment, the organopolysiloxane (B) may be a radiation-curable epoxy organopolysiloxane. These compounds are sometimes referred to as radiation-curable epoxy polysiloxanes or epoxy silicones. These include radiation-curable epoxy polydimethylsiloxanes.

In one embodiment, the epoxy organopolysiloxane (B) is represented by the formula:

wherein in formula (B-4): each R is independently a hydrocarbon group of 1 to about 18 carbon atoms, and in one embodiment 1 to about 6 carbon atoms; E is a monovalent epoxy containing hydrocarbon group; G is a silyl group represented by the formula R₃Si— or R₂ESi— wherein R is as defined above; a is a number in the range of about 10 to about 300, and in one embodiment about 50 to about 200; and b is a number in the range of about 2 to about 10.

Illustrative examples of the hydrocarbon group R in formula (B-4) include alkyl groups such as methyl, ethyl, propyl, isopropyl, butyl, isobutyl, tert-butyl, hexyl, octyl and octadecyl; aryl groups such as phenyl, naphthyl and bisphenylyl; alkaryl groups such as tolyl and xylyl; aralkyl groups such as phenylmethyl, phenylpropyl and phenylhexyl; and cycloaliphatic groups such as cyclopentyl, cyclohexyl and 3-cyclohexylpropyl; and ether oxygen- or ester oxygen-containing groups such as ethoxypropyl, butoxybutyl, and ethoxycarbonylpropyl and the like. The siloxane groups,

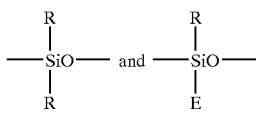

are ordered or randomly arranged in the epoxy organopolysiloxane and the epoxy-containing hydrocarbon group, E, contains at least one epoxy group,

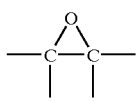

the remainder being comprised of carbon and hydrogen and, in addition to the oxirane oxygen, this group may optionally contain ether, —O—, or carbonyl oxygen, e.g.,

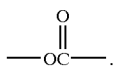

Illustrative examples of E include:

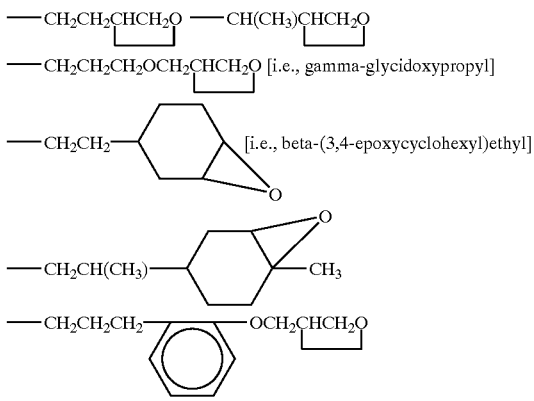

In the above epoxy-containing hydrocarbon groups, the epoxy group is preferably located at the terminal position but it need not be a terminal group.

The epoxy organopolysiloxanes can be prepared by many methods known in the art such as the chloroplatinic acid catalyzed addition reaction of hydrosiloxanes, containing the ≡SiH reactive group, with aliphatically unsaturated epoxy compounds, epoxidation of vinyl or like unsaturated siloxanes and Grignard type reactions as for example described by E. P. Plueddemann and G. Fanger, J. Am. Chem. Soc. 81, 2632–35 (1959), and U.S. Pat. Nos. 4,279,717; 5,258,480; 5,360,833; 5,391,676; and 5,397,813 which are incorporated herein by reference.

Examples of a useful epoxy organopolysiloxanes that are commercially available are UV 9400 and UV9430 which are available from GE Silicones and are described in greater detail below.

In one embodiment, the organopolysiloxane (B) may be an organosiloxane copolymer represented by the formula $(R_3SiO)_x(SiO_{4/2})_y$ (B-5)

wherein in formula (B-5), each R is independently a hydrocarbon group or a group represented by the formula

—O(O)C—(R*)=CH₂ wherein R* is hydrogen or a methyl or ethyl group; x is a number from about 1 to about 75, and in one embodiment about 3 to about 26; y is a number from about 1 to about 56, and in one embodiment from about 10 to about 20; and the ratio of x to y is from about 0.3:1 to about 1.5:1, and in one embodiment about 0.3:1 to about 1.3:1, and in one embodiment 0.7:1 to about 1.5:1, and in one embodiment about 0.8:1, and in one embodiment about 0.65:1. These compounds may have number average molecular weights of up to about 10,000. Each R in formula (B-5) may be the same or different and may contain up to about 10 carbon atoms, and in one embodiment about 2 to about 6 carbon atoms. Each R can be independently an alkyl group such as methyl, ethyl, isopropyl, butyl or hexyl; an alkenyl group such as vinyl, allyl or hexenyl; an aryl group such as phenyl, tolyl or xylyl; an aralkyl group such as beta-phenylethyl or beta-phenylpropyl; a cycloaliphatic group such as cyclopentyl, cyclohexyl or cyclohexenyl; or an acrylic group such as acrylate or methacrylate.

Copolymers of the type represented by formula (B-5) are sometimes referred to in the art as MQ resins due to the fact that the group R₃SiO is a monofunctional group (M) and the group SiO₄/₂ is a quadrafunctional group (Q). Copolymers of this type are well known in the art and described, for example, in U.S. Pat. No. 2,676,182, which is incorporated herein by reference for its teachings regarding the preparation of such copolymers. Briefly summarized, these copolymers can be prepared by acidifying an aqueous solution of sodium silicate using a mixture of hydrochloric acid and isopropanol. The resulting acidic silica hydrosol is then treated with a source of R₃SiO₁/₂ siloxane units, such as R₃SiOCH₃, R₃SiCl or R₃SiOSiR₃, dissolved in a mixture of isopropanol and xylene. The molar ratio of R₃SiO₁/₂ units to the SiO₄/₂ units derived from the sodium silicate is generally from about 0.3:1 to about 1.5:1, and in one embodiment about 0.3:1 to about 1.3:1. After being heated, the reaction mixture is cooled, separated into an aqueous phase, which is discarded, and a nonaqueous phase comprising the siloxane copolymer. The siloxane copolymer is further washed with water to reduce its acid number and to remove water-soluble components, such as isopropyl alcohol. In one embodiment, siloxane components, such as isopropyl alcohol. In one embodiment, siloxane copolymer has sufficient acid remaining therein to provide an acid number of from about 0.2 to about 2.

An example of a commercially available copolymer of the type represented by formula (B-5) in which the R group is vinyl is available from GE Silicones under the trade designation SL 5030. Another example is the organosiloxane copolymer present in RC-708, which is a product of Goldschmidt Chemical that is believed to be a mixture of a dimethylpolysil oxane and an organosiloxane copolymer of the type represented by formula (B-5). Other commercially available copolymers that are useful include: SL4406, SL5070 and SL6030 available from GE Silicones; Syl-Off 7602, 7679, Q2-7069 and 7810 available from Dow Corning; PC-290 available from Rhone-Poulenc; and VP1517, CRA-17 and CRA-64 available from Wacker. Solvent-borne versions of these copolymers are available from PCR Inc. under the designations MQV-4, MQOH-4, MQOH-6 and MQDH-1.

The inventive release compositions may contain from about 5 to about 30% by weight of component (A), and in one embodiment about 10 to about 20% by weight. These compositions may contain from about 69 to about 96% by weight of component (B), and in one embodiment about 70% to about 95% by weight, and in one embodiment about 74 to about 86% by weight, and in one embodiment about 80% to about 90% by weight.

The inventive release compositions may contain at least one photoinitiator. The amount of photoinitiator included in the release compositions may range from about 0% to about 10% by weight, and in one embodiment from about 0.5% to about 5% by weight, based on the total weight of the release composition (excluding the weight of the surface treated particulate solids). A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc.

Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The photoinitiator may be an onium salt. Examples of the onium salts that can be used include bis(alkylphenyl) iodinium hexafluroantimonate and bis(alkyl phenyl) iodinium tetralkis pentafluoro phenyl borate, wherein the alkyl groups independently contain 1 to about 18 carbon atoms, and in one embodiment about 6 to about 18 carbon atoms, and in one embodiment about 12 carbon atoms. These compounds are known in the art. Examples of commercially available onium salts that are useful include UV9380c which is a product of GE Silicones and is described more fully below.

The release compositions of the present invention may be applied to the desired substrate as a coating by any conventional technique known in the coating art such as roller coating, curtain coating, brushing, spraying, reverse roll coating, doctor knife, dipping, die coating, offset gravure techniques, etc. The liquid being applied to the substrate may be heated or cooled to facilitate the coating process and to alter the depth of the penetration of the liquid coated on to the substrate prior to curing.

A variety of substrates can be coated with the inventive release compositions, and these compositions can be applied to any substrate when it is desirable to modify the release properties of a surface of the substrate. For example, the compositions of the present invention can be employed to form release coatings on substrates such as paper, vinyl, polyvinyl chloride films, polyester films, polyolefin films, non-woven fabrics, glass, steel, aluminum, etc. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. The present invention is particularly useful in providing release characteristics to paper and polymeric films.

The amount of the inventive release composition applied to the various substrates varies depending upon the characteristics of the substrate, the properties desired in the release coating, the radiation source utilized, and the particular formulation of the release composition. If an excess of the release composition is applied to the substrate, the physical characteristics of the substrate may be affected in an undesirable manner. Also, for economic reasons, it is normally desired to apply the lowest amount of coating to obtain the desired result. Thus, applied coating weights may, depending on the substrate and intended use, vary over a wide range but typically range from about 0.1 to about 10 or more grams per square meter (gsm). In general, when it is desired to produce a release-coated paper useful as a protective cover for a pressure-sensitive adhesive tape, the applied coating weights are from about 1 to about 3 gsm. At these levels, desirable high release characteristics are obtained without distorting the essential components of the substrate so that a flat construction which has good performance in the end use can be produced.

In one embodiment, curing of the inventive release composition is performed at room temperature depending upon the particular organopolysiloxane used and the particular curing agent or catalyst used in conjunction with said organopolysiloxane. To avoid premature curing, the catalyst may be hindered with molecules that act as blocking agents. At elevated temperatures these blocking agents disassociate from the catalyst thereby initiating the cure reaction. However, for practical continuous operations the time required for curing at room temperature may be too long. Most curing agents or catalysts are capable of promoting relatively rapid curing at moderate elevated temperatures. This temperature at which relatively rapid curing takes place is sometimes referred to as the curing initiating temperature even though curing will take place at room temperature. In one embodiment, the curing temperature is in the range of about 70° C. to about 350° C. Once curing has been initiated and maintained at an elevated temperature for a short period of time as described herein, the curing can then advantageously be allowed to proceed by aging at reduced temperatures, e.g., at room temperatures or moderately (about 10° C. to 30° C.) above room temperature. The choice of temperature actually employed in the curing steps will depend upon a number of factors such as the type of organopolysiloxane used, the curing catalyst used with said organopolysiloxane, and the rate at which the coated substrate is passed through the heating zone.

In one embodiment, the inventive release composition is cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. One of the advantages of using radiation to effect cure of the composition is that polymerization takes place rapidly at ambient temperature, and heating is not necessary. The equipment for generating these forms of radiation are well known to those skilled in the art.

Curing of the inventive release compositions can be effected in a continuous manner by passing the release-coated substrate through radiation equipment which is designed to provide the coated substrate with sufficient residence time to complete the cure of the coating. Curing may be effected in an air atmosphere or in an inert atmosphere such as nitrogen or argon. The length of exposure necessary to cure the release compositions of the present invention varies with such factors as the particular formulation used, type and wavelength of radiation, dose rate, energy flux, concentration of photoinitiator (when required), the atmosphere and thickness of the coating. A total dosage of from about 0.2 to about 10 megarads, and in one embodiment about 1 to about 2 megarads, is typically sufficient to cure the inventive release compositions. Generally, the time of exposure that is required is about 0.1 to about 3 seconds, and in one embodiment about 0.5 to about 1 second. The actual exposure time required to give proper curing for various release compositions can be readily determined by one skilled in the art with a minimum of experimentation. In one embodiment, the dosage is about 50 to about 200 $mj/cm^2$, and in one embodiment about 70 to about 120 $mj/cm^2$.

In one embodiment, it is advantageous for the functional groups of component (A) to be compatible with the curing system used for the organopolysiloxane (B). Thus, for example, it is advantageous to use as component (A) the structure shown in formula (A-1) or the structure shown in formula (A-2) wherein T is OH when the organopolysiloxane (B) is cured using cationic UV radiation. It is advantageous to use as component (A) the structure shown in formula (A-2) wherein T is

when the organopolysiloxane (B) is cured using UV, electron beam or peroxide cure. It is advantageous to use as component (A) the structure shown in formula (A-2) wherein T is

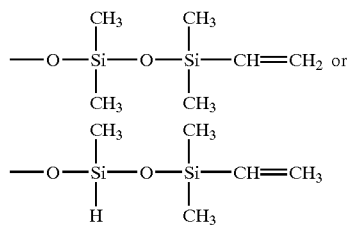

when the organopolysiloxane (B) is cured using as a catalyst a compound containing platinum or rhodium. It is advantageous to use a component (A) the structure shown in the formula (A-2) wherein T is

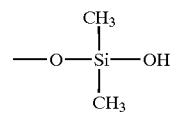

when the organopolysiloxane (B) is cured using as a catalyst a compound containing tin.

An advantage of the inventive release compositions is that, in one embodiment, they are resistant to moisture and solvents. In one embodiment, they are thermally stable. A substrate which is coated with the cured release composition of the present invention can be used as a protective covering for a second substrate having pressure-sensitive adhesive coating on its surface. The protective covering is normally applied to the adhesive-coated substrate by bringing the two coated substrates into surface-to-surface contact with the release coating on the first substrate in contact with the pressure-sensitive adhesive on the second substrate. Application of a slight pressure is usually effective to cause the coated substrates to adhere together forming a four-layered laminate. When a coated release paper prepared in accordance with the present invention is used as a protective covering on a pressure-sensitive adhesive tape, a desirable high-release force is required before the release-coated paper will separate from the adhesive tape, and there is little transfer of the silicone release coating from the paper onto the adhesive. The inventive release composition is useful particularly to prepare coated papers which are useful in high-speed equipment such as labeling equipment where a high release force is desired at the high peel rates utilized.

An advantage of the inventive release compositions is that, in one embodiment, they exhibit relatively high release force values while at the same time they exhibit relatively low levels of release noise. The release force value may be measured using a 90° release test method (90° RTM). This method measures the force in grams per inch required to remove a release liner from an adhesive construction at an angle of 90° and a rate of either 300 inches per minute (ipm) or 12 imp. The 90° RTM release force values at 300 ipm typically exhibited for the inventive release compositions range from about 20 to about 300 grams per inch, and in one embodiment about 50 to about 200 grams per inch. The 90° RTM release force values at 12 ipm typically range from about 3 to about 50 grams per inch, and in one embodiment about 10 to about 30 grams per inch.

In one embodiment, the release noise is measured by dividing the standard deviation of release force measurements for 90° RTM by the actual release force measurement for a specific sample to provide a percent noise value. These noise values typically range from zero to about 40%, and in one embodiment about 1 to about 20%, and in one embodiment about 1 to about 15%, and in one embodiment about 1 to about 10%, and in one embodiment about 1 to about 5%.

In one embodiment, the release noise is subjectively rated by the sound produced when delaminating samples.

While not wishing to be bound by theory, it is believed that at least in one embodiment of the invention the combination of relatively high release force and relatively low release noise exhibited with the inventive release compositions is achieved as a result of the monofunctional character of component (A) and the pendant methyl groups along the hydrocarbon chain of this material.

The present invention also provides for the use of the compositions described above in the preparation of multi-layer articles or constructions comprising (a) a first substrate; (b) a second substrate; (c) a release layer comprising the inventive release coating composition which has been cured, and (d) a layer comprising a pressure-sensitive adhesive composition, wherein the release layer (c) is positioned between the first substrate and the layer of pressure-sensitive adhesive and is preferentially adherent to the first substrate, and the pressure-sensitive adhesive layer (d) is positioned between the release layer and the second substrate and is preferentially adherent to the second substrate. Additional layers can be interdispersed between the first substrate and the layer of pressure-sensitive adhesive and between the second substrate and the release layer to provide additional desirable properties such as increased strength, increased dimensional stability, etc. The first and second substrates may comprise a variety of materials including paper, polymer films (e.g., polyolefins, vinyl, polyester, etc.) aluminum, etc., although substrates such as vinyl, polyolefins and paper are preferred.

With reference to the multi-layered articles or constructions utilizing at least one layer of a pressure-sensitive adhesive composition, any pressure-sensitive adhesive composition known in the art can be utilized. Such adhesive compositions are described in, for example, "Adhesion and Bonding", *Encyclopedia of Polymer Science and Engineering,* Vol. 1, pages 476–546, Interscience Publishers, 2nd Ed. 1985. Such compositions generally contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any particular multi-layer article or construction is not critical to this invention, and those skilled in the art are familiar with many suitable pressure-sensitive adhesives. However, as known to those skilled in the art, the pressure-sensitive adhesive and the release layer should not chemically react.

In the following examples, the commercial materials that are used are as follows:

| Tradename | Chemical | Supplier |
|---|---|---|
| UV9330 | Radiation curable epoxy-modified siloxane release polymer. | GE Silicones |
| UV 9400 | Epoxy polydimethyl siloxane having a pendant functionality of 3–4, a terminal functionality of 2, a molecular weight of 7700, an epoxy equivalent weight of 1400, a degree of polymerization of 96, and a viscosity of 300 centipoise at room temperature. | GE Silicones |
| UV 9430 | Epoxy polydimethyl siloxane having a pendant functionality of zero, a terminal functionality of 2 an epoxy equivalent weight of 1700, a degree of polymerization of 27, and a viscosity of 300 centipoise at room temperature. | GE Silicones |
| UV 9380c | Bis (dodecyl phenyl) iodinium hexafluoroantimonate in alkylglycidylether with 2% by weight isopropyl thioxanthone. | GE Silicones |
| Vikopol 24 | Epoxidized polybutene containing approximately 24 carbon atoms and having an estimated molecular weight of 365. | Elf Atochem |

EXAMPLE 1

Release coating compositions having the formulations indicated below are prepared (all numerical values in the table below being in parts by weight):

| | Sample | |
|---|---|---|
| | A | B |
| UV 9400 | 32.5 | 47.5 |
| UV 9380c | 2.5 | 2.5 |
| UV 9430 | 50.0 | 50.0 |
| Vikopol 24 | 15.0 | — |

Sample A is representative of the invention while Sample B is a control sample provided for purposes of comparison. Release coated liners are made using Samples A and B by drawing the samples down on sheets of UV350 42 pound SCK paper supplied by Otis Speciality Papers. The drawdown is accomplished by placing a sample of wet coating on the top edge of the felt side of a first 8.5×11 inch sheet of UV350 paper. A second sheet of 8.5×11 inch UV350 paper is then placed on top of the first sheet of paper felt side down with the wet coating sample between the two sheets of paper. A laminate is thus formed consisting of the wet coating sample placed between two sheets of UV350 paper with the felt side of each sheet of paper in contact with the coating sample. The wet coating is spread evenly across the area of each sheet of UV350 paper by advancing the laminate through a laminator at a pressure of 40 psi and a rate of one inch per second. After the laminate exits the laminator, the two sheets of UV350 paper are separated by hand to produce two coated sheets. The weight of the wet coating on each sheet is 1.3–1.4 gsm. The coated sheets are cured by advancing each sheet through a benchtop UV curing unit supplied by Fusion Inc. under the following conditions:

Line speed: 150 fpm
Radiation type: 600 watt fusion 55% Power, "H" bulb
Dose: 150 mj/cm$^2$ Multi-layered constructions are made by adhering the resulting release coated sheets to the adhesive surface of an adhesive coated facestock. The facestock is 2.0 mil polyester film. The adhesive is Avery adhesive I450, which is a product of Avery Dennison identified as a rubber adhesive. The multi-layered constructions are tested for release performance using 90° RTM at a rate of 300 ipm. The results are as follows:

| Sample | Release Force |
|---|---|
| A | 65.4 grams/inch |
| B | 36.0 grams/inch |

EXAMPLE 2

Example 1 is repeated except that the lamination pressure is 60 psi and the adhesive is Avery P33, which is a product of Avery Dennison identified as a hot melt adhesive. The noise is measured subjectively by listening to the sound made as the paper liner is removed. The results are as follows:

| Sample | Release Force | Noise |
|--------|---------------|-------|
| A | 20 grams/inch | Smooth |
| B | 7 grams/inch | Noisy |

EXAMPLE 3

Tesa 7475 tape (a product of Tesa identified as an acrylic adhesive tape) is laminated to Samples A and B using a laminator at a pressure of 60 psi and a rate of one inch per second. A six pound metal plate is placed on the resulting laminate samples. One set of laminate samples is aged at room temperature (RT) for one day. Another set is aged at 158° F. for one day. After aging, the samples are measured for release force and release noise. The release force is determined using 90° RTM at a rate of 300 ipm. The results are indicated below.

|  | Sample | |
|---|---|---|
|  | A | B |
| RT Release Force (g/in) | 216.2 | 81.5 |
| 158° F. Release Force (g/in) | 258.0 | 94.0 |
| Percent Noise | 2.5 | 3.8 |

EXAMPLE 4

Release coating compositions having the formulations indicated below are prepared (all numerical values in the table below are in parts by weight):

|  | C | D | E | F | G | H |
|---|---|---|---|---|---|---|
| UV9400 | 42 | 32 | 17 | 7 | 27 | 4 |
| UV9380C | 3 | 3 | 3 | 3 | 3 | 3 |
| UV9430 | 50 | 50 | 75 | 75 | 60 | 75 |
| Vikopol 24 | 5 | 15 | 5 | 15 | 10 | 15 |
| UV9330 | 0 | 0 | 0 | 0 | 0 | 3 |

Samples C–H are coated on sheets of UV350 42 pound SCK paper following the procedure described in Example 1. The coatings are cured by passing the sheets through the Fusion benchtop UV curing unit referred to in Example 1 at a rate of 150 fpm under a Fusion "H" 600 watt bulp at 55% power to produce approximately 150 mj/cm². Inerting with nitrogen is used to displace humid air and oxygen to provide an atmosphere with less than 200 ppm oxygen. Composite adhesive constructions are prepared using Avery P33 adhesive tape and Tesa 7475 tape. The Avery P33 adhesive tape is conditioned at 54% relative humidity prior to lamination to the cured release coated sheets. Some of Tesa 7475 samples are aged at room temperature for one day prior to lamination, and some are aged at 158° F. for one day prior to lamination. The average release force in grams per inch using 90° RTM, the standard deviation (SD) for the release force values and the percent noise for each sample is indicated below:

|  |  | C | D | E | F | G | H |
|---|---|---|---|---|---|---|---|
| Avery P33 @ 12 ipm | Avg. | 3.1 | 4.7 | 11.5 | 23 | 5.7 | 15 |
|  | SD | 1.2 | 0.5 | 1.7 | 1.5 | 1.5 | 1 |
|  | Noise | 39 | 11 | 15 | 7 | 26 | 7 |
| Avery P33 @ 300 ipm | Avg. | 5 | 14.5 | 27.9 | 62.6 | 21.1 | 39.8 |
|  | SD | 0.14 | 1.6 | 4 | 1.1 | 2.4 | 2.5 |
|  | Noise | 3 | 11 | 14 | 2 | 11 | 6 |
| Tesa 7475 RT @ 300 ipm | Avg. | 169 | 239 | 281.5 | 424.5 | 264 | 342 |
|  | SD | 1.4 | 0 | 3.5 | 7.8 | 2.8 | 11.3 |
|  | Noise | 0.8 | 0 | 1 | 2 | 1 | 3 |
| Tesa 7475 158° F. @ 300 ipm | Avg. | 180 | 249.5 | 325 | 496 | 289.5 | 408 |
|  | SD | 8.5 | 0.7 | 0 | 5.7 | 2.1 | 11.3 |
|  | Noise | 5 | 0 | 0 | 1 | 1 | 3 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A curable release composition, comprising:

(A) a compound represented by the formula

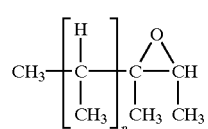

(A-1)

or

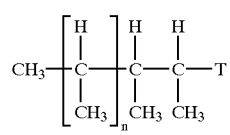

(A-2)

wherein: n is a number in the range of about 1 to about 60; and T is

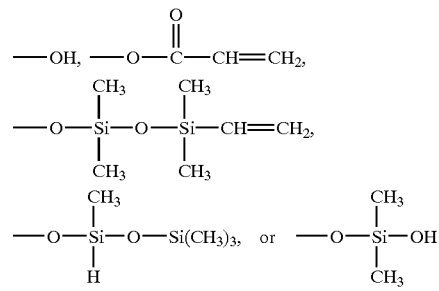

(B) a curable organopolysiloxane, wherein, when applied to a substrate and cured, the composition exhibits a 90° RTM release force value at 300 inches per minute in the range from about 20 to about 300 grams per inch.

2. The composition of claim 1 wherein (A) is a compound represented by the formula

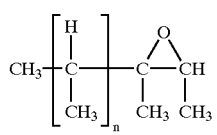
(A-1)

wherein in formula (A-1) n is a number in the range of about 1 to about 60.

3. The composition of claim 1 wherein (B) is a room temperature curable or thermally curable organopolysiloxane.

4. The composition of claim 1 wherein (B) further comprises at least one catalyst for curing said organopolysiloxane.

5. The composition of claim 1 wherein (B) further comprises a cure accelerator, adhesivity promoter, or mixture thereof.

6. The composition of claim 1 wherein (B) is a radiation curable organopolysiloxane.

7. A curable release composition, comprising:

(A) a compound represented by the formula

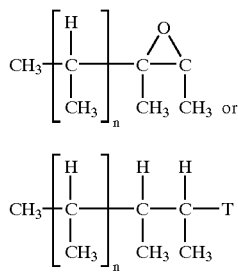
(A-1) or (A-2)

wherein: n is a number in the range of about 1 to about 60; and T is

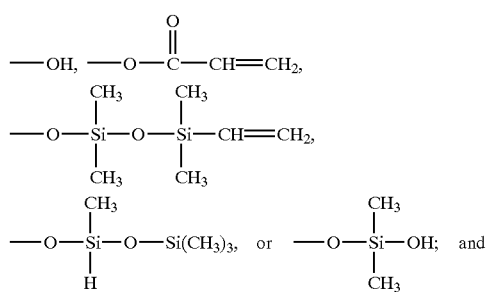

(B) a radiation curable organopolysiloxane containing acryloxy groups, methacryloxy groups, or mixtures thereof.

8. The composition of claim 1 wherein (B) is an epoxy organopolysiloxane.

9. A curable release composition, comprising:

(A) a compound represented by the formula

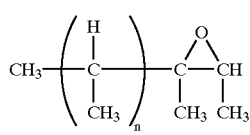
(A-1)

or

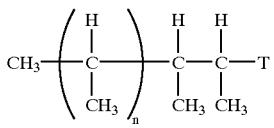
(A-2)

wherein: n is a number in the range of about 1 to about 60; and T is

—OH, —O—C(=O)—CH=$CH_2$,

—O—Si($CH_3$)$_2$—O—Si($CH_3$)$_2$—CH=$CH_2$,

—O—Si($CH_3$)(H)—O—Si($CH_3$)$_3$, or —O—Si($CH_3$)$_2$—OH; and (B) an organosiloxane copolymer represented by the formula $(R_3SiO)_x(SiO_{4/2})_y$ (B-5)

wherein in formula (B-5): each R is independently a hydrocarbon group or a group represented by the formula

—O(O)C—(R*)=$CH_2$ wherein: R* is hydrogen, methyl or ethyl; x is a number in the range of about 1 to about 75; y is a number in the range of about 1 to about 56; and the ratio of x to y is from about 0.3:1 to about 1.5:1.

10. A curable release composition, comprising:

(A) a compound represented by the formula

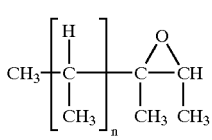
(A-1)

wherein: n is a number in the range of about 4 to about 40; and (B) a curable organopolysiloxane, wherein, when applied to a substrate and cured, the composition exhibits a 90° RTM release force value at 300 inches per minute in the range from about 20 to about 300 grams per inch.

* * * * *